May 8, 1951 P. R. PRENTICE 2,551,701
FOLDABLE CAR SEAT EXTENSION
Filed Nov. 4, 1949 2 Sheets-Sheet 1
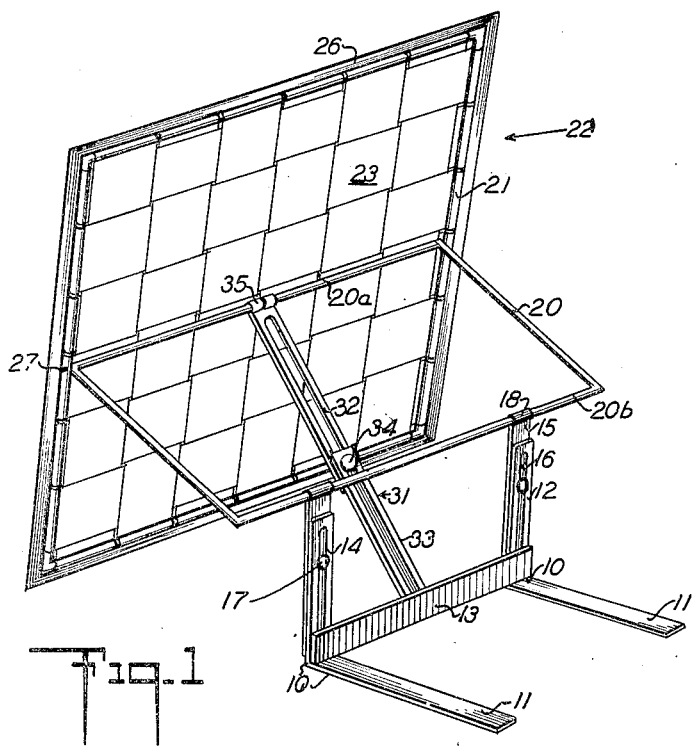
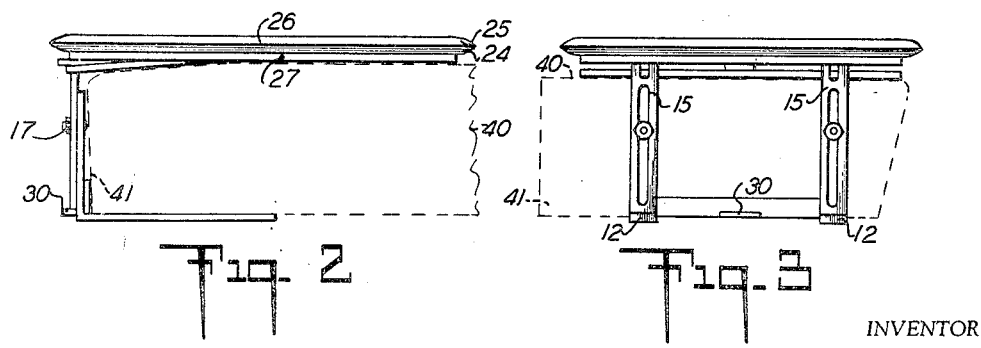
INVENTOR
PAUL R. PRENTICE
BY Fisher & Christen,
ATTORNEYS

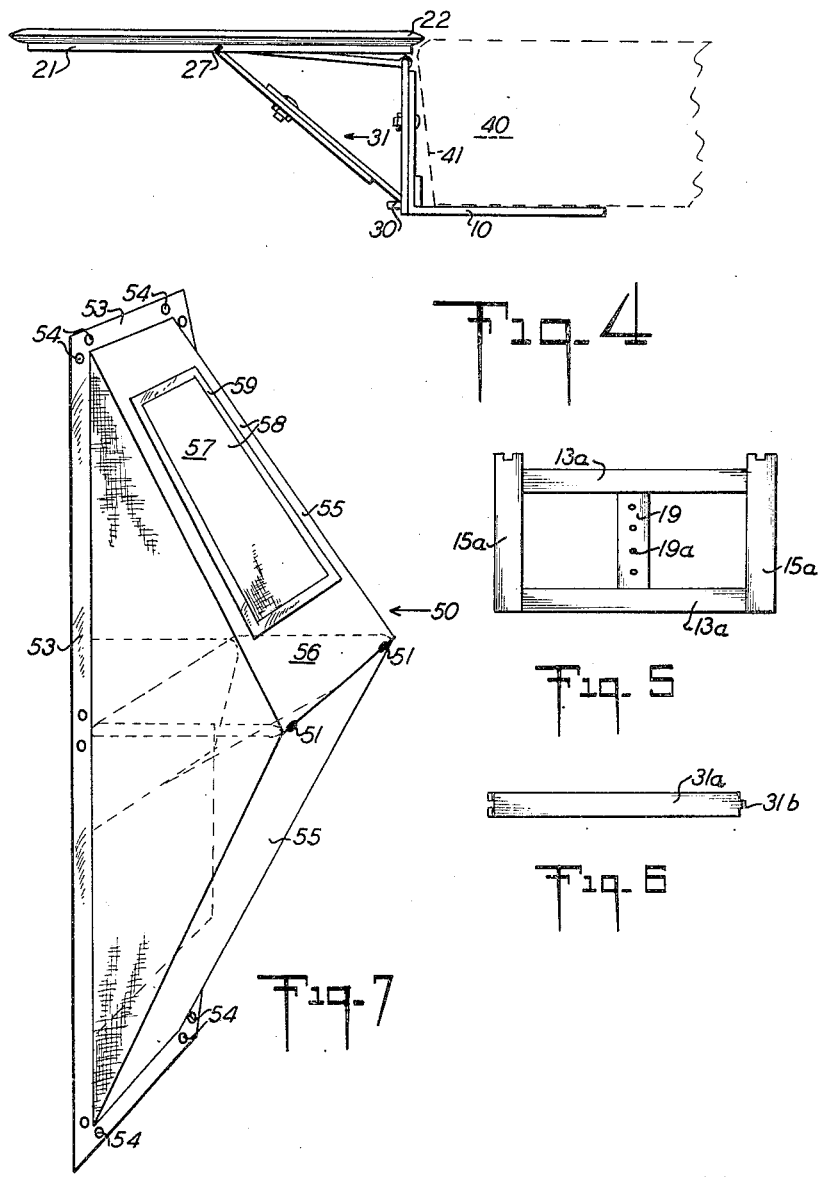

Patented May 8, 1951

2,551,701

UNITED STATES PATENT OFFICE 2,551,701

FOLDABLE CAR SEAT EXTENSION

Paul R. Prentice, Cushing, Okla.

Application November 4, 1949, Serial No. 125,427

11 Claims. (Cl. 155—6)

This invention relates to a folding car seat extension and has particular relationship to a device of this type which is adapted to extend the width of a car seat when in unfolded position and which is adapted to be supported on a car seat when in folded position.

The present invention has found particular use in connection with truck seats and seats of tractor-trailer type. In car seat constructions of this type, the seat width is normally insufficient to permit the driver to lie down on the seat and be supported thereby along the entire length of his body. Thus, the present invention has found its principal use by truck drivers who pull off to the side of the road and stretch out on the car or truck seat in order to sleep. In such instances, it is normally necessary to open at least one of the car or truck doors so as to permit the driver to extend either his head or feet, or both, beyond the width of the car seat.

Accordingly, it is an object of the present invention to provide a foldable car seat extension which is adapted to form a seat extension substantially alongside the car seat when in unfolded position and which is adapted to be supported directly on the car seat when in folded position, as in the form of a car seat pad.

Another object of the invention is to provide a car seat extension which may be permanently carried by a car seat and which will at the same time be easily and readily removable therefrom Still another object of the invention is to provide a car seat extension which may be rigidly attached to the side of a car seat without requiring the use of attaching means such as clamps, bolts or the like.

Still another object of the invention is to provide a car seat extension including a collapsible and removable cover which is adapted to enclose both the car seat extension and the adjacent door opening of the car.

Yet another object of the present invention is to provide a collapsible and extensible car seat extension which is of simple, inexpensive and rigid construction and which may be so constructed as to be readily adjustable so as to nest against and be positioned in alignment with the car seat.

These and other objects of the invention will be better understood by reference to the following description and accompanying drawings.

The present invention is generally directed to a foldable car seat extension comprising an L-shaped base having a lateral base leg adapted to fit under a car seat and an upright adapted to nest against the outer side of a car seat, said upright being provided at its upper end with a hinge, a frame pivotally mounted on one side to said base, a seat structure pivotally mounted on the other side of said frame, and a support member pivotally mounted at one end on said other side of said frame and engageable at the other end with said L-shaped base whereby said seat structure is supportable on the car seat in folded position and forms a seat extension substantially alongside the car seat when in unfolded and extended position. In its preferred embodiments, the present structure includes an L-shaped base wherein the upright portion is vertically adjustable and wherein the support member pivotally mounted to the frame is longitudinally adjustable. Additionally, in the preferred construction the base comprises a pair of L-shaped frame members laterally connected by a cross-bar which is provided with an abutment adapted to engage the free end of the adjustable support member. Preferably, in the present construction, the seat structure is pivotally mounted at about its center portion to the supporting frame. In a further embodiment the foldable car seat construction includes a tent shaped covering adapted to be fastened at its apex to said seat structure and at its base edges to the car body whereby to enclose said car seat extension and the adjacent door opening of the car. Preferably, the tent shaped covering construction includes a resilient, cord connected between said apex and said opposing base edges to maintain the covering taut.

Referring to the drawings:

Fig. 1 is a perspective view showing a car seat attachment of the present invention in partially opened position;

Fig. 2 is a side view showing a car seat attachment of the present invention in closed and folded position nesting against the outer side of the car seat with the seat portion of the attachment supported on the car seat;

Fig. 3 is an end view of the device as shown in Fig. 2 showing the preferred adjustable L-shaped base construction;

Fig. 4 is a side view showing a car seat attachment of the present invention in open and unfolded position with the seat attachment extended substantially alongside the car side;

Fig. 5 is an end view of a modified form of the base shown in the preceding figures;

Fig. 6 is a plan view of a modified form of the brace or support 31 adapted for use with the modified form of base shown in Fig. 5, and Fig. 7 discloses the foldable car seat extension as illustrated in the previous figures including a preferred form of the tent-shaped covering adapted to be attached at its apex to the folded seat structure and at its base edges to the car body (not shown) so as to enclose the car seat extension and the adjacent door opening (not shown) of the car.

Referring to the drawings, particularly Fig. 1, the folding car seat extension of the present invention generally includes an L-shaped base 10. The L-shaped base 10 preferably comprises a pair of L-shaped members comprising a lateral base extension 11 and a vertical upright 12 integrally joined by a lateral cross-bar 13. As shown, the vertical uprights 12 are preferably constructed to be vertically adjustable, as by means of longitudinal slots 14, extension uprights 15 having mating vertical slots 16 so as to be vertically adjustable and connected by suitable fasteners such as nuts and bolts 17. The upper end portions of the vertical uprights are provided with hinges 18 adapted to pivotally carry a frame structure 20 which is preferably in rectangular form having an area of about one-half that of the seat structure frame. As stated, one side of the supporting frame 20b is pivotally carried by the hinges 18. The opposite side 20a of the supporting frame pivotally carries a seat frame 21 which is preferably of rectangular configuration, being mounted at about one-half way along its side to the frame end 20a. The seat frame 21 has mounted thereon a seat covering indicated generally at 22. While the seat covering may comprise any conventional construction, it preferably includes a woven cord base 23, a hair mat intermediate section 24 and a foam rubber pad section 25 which is enveloped by a suitable tough and durable cover 26 as of leatherette, leather or plastic.

An abutment or rest 30 is provided on the L-shaped base, preferably on the lateral cross-bar 13. A brace or support 31 is pivotally mounted at one end, as by a hinge 35 to the support frame side 20a with its free end adapted to be positioned against the abutment 30. Preferably, the support or brace 31 is constructed so as to be longitudinally adjustable, as by means of a pair of longitudinally slotted adjustable bars 32 and 33, suitably joined as by means of nut and bolt 34.

In use, the foldable car seat extension of the present invention may be readily, rigidly and removably attached to a car seat 40 by inserting the base members 11 under the car seat for a distance sufficient that the uprights 12 will nest against the outer side 41 of the car seat, as shown in Figs. 2, 3 and 4.

In the unfolded and extended position, the brace 31 is positioned so that it is free and engages the abutment 30 and its hinged end 35 is substantially in horizontal parallelism with the hinge 18 of the upright and away from the car seat. It will be apparent that by means of this particular structure, the seat itself is supported on the side nearest the car seat by the frame 20, particularly the side 20b of the frame, whereas the side per se is supported at about its center by the other side 20a to which the side frame 21 is pivotally mounted as at 27.

In folding the structure to its collapsible position so that the side per se 22 will rest directly on the top of the car seat 40, it is only necessary to lift the seat portion 22 upwardly and toward the car seat. By this movement, the free end of the brace 31 is disengaged from the abutment member 30 and is caused to swing downwardly since it depends from its hinge 35 pivotally mounted on the frame side 20a. As the seat per se is moved directly over the car seat and is lowered thereon, the brace 31 engages the frame side 20b, the frame 20 having been pivoted about the hinge 18 toward the car seat. Thus, it will be apparent, as shown in Fig. 2, that the brace 31 is nested between the frame side 20b and the side frame 21 when the seat 22 is rested on the car seat 40 with the entire structure in folded position.

In a modified form of the invention as shown in Figs. 5 and 6, the uprights 15a are unitary and non-extensible, the upper and lower lateral cross-bars 13a being joined, as by welding, flush with the uprights 15a. An abutment bar 19, having a plurality of vertical abutments shown in the form of holes 19a, is mounted centrally, as by welding, between the cross-bars 13a to provide vertical adjustment means in cooperation with a non-extensible brace 31a having a punch-type end portion 31b adapted to be inserted into or against one of the abutment holes 19a. Thus, in this modified form of the invention, the base and support members may be non-extensible and yet provide adjustment means for positioning the seat 22.

It will be apparent that among the possible modified constructions, the abutment bar 19 may be omitted and the abutments, such as holes 19a or the rest 30, may be mounted on the uprights 15a. Conversely, the uprights 15a may be omitted, the hinges 18 being mounted on the upper cross bar 13a, or on the abutment bar 19 which may be extended upwardly beyond the upper cross bar 13a.

In a preferred embodiment, the present structure includes a generally tent shaped cover 50, as shown in Fig. 7. The apex of the tent is fastened as by means of clips positionally indicated at 51 to the outer side of the seat frame 21 or seat per se 22. The tent covering material 52 is preferably water repellent, the base edges thereof being preferably provided with edge binding 53 as of canvas with the base edges generally defining a rectangular or six-side shape. The base edges 53 may be fastened to the car body (not shown) adjacent the door opening (not shown) as by means of suction cups 54. The tent covering is preferably held taut as by means of elastic cords 55 which are connected to the apex of the covering and to the base edges, as shown. The top panel of the covering may be provided with a flap or window 57 which may be either of transparent sheeting, screening or netting, which is joined as by means of a seam or tape 58 to the covering. It will be apparent that by means of the covering structure shown, that the car door opening may be protected from the elements and insects when the car seat extension is in use.

Preferably, the present device is constructed of aluminum or steel tubing and bar stock. It will be understood that the present invention has been described in a preferred embodiment and that various modifications may be made thereon by those skilled in the art and it is intended to include all such modifications as fall within the sphere and scope of the appended claims.

I claim:

1. A foldable car seat extension comprising an L-shaped base having a lateral base leg adapted to fit under a car seat and an upright adapted to nest against the outer side of a car seat, said upright being provided at its upper end with a hinge, a frame pivotally mounted on one side to said base by means of said hinge, a seat structure pivotally mounted on the other side of said frame, and a support member pivotally mounted at one end of said other side of said frame member and engageable at the other end with said L-shaped base whereby said seat structure is supportable on the car seat in folded position and forms a seat extension substantially alongside the car seat when in unfolded and extended position.

2. The foldable car seat extension set forth in claim 1 wherein the upright portion of the L-shaped base is vertically adjustable.

3. The foldable car seat extension set forth in claim 1 wherein the support member pivotally mounted at one end of said other side of said frame is longitudinally adjustable.

4. The foldable car seat extension set forth in claim 1 wherein the L-shaped base frame comprises a pair of L-shaped frame members connected by a lateral cross bar.

5. The foldable car seat extension set forth in claim 1 wherein the L-shaped base frame comprises a pair of L-shaped frame members connected by a lateral cross bar, said cross bar being provided with an abutment adapted to engage said other end of said support member.

6. The foldable car seat extension set forth in claim 1 wherein said seat structure is pivotally mounted at about its center portion on the other side of said frame.

7. The foldable car seat extension set forth in claim 1 including a tent shaped covering adapted to be fastened at its apex to said seat structure and at its base edges to the car body whereby to enclose said car seat extension and the adjacent door opening of the car.

8. The foldable car seat extension set forth in claim 1 including a tent shaped covering adapted to be fastened at its apex to said seat structure and at its base edges to the car body, a resilient cord connected between said apex and said opposing base edges to maintain the covering taut whereby to enclose said car seat extension and the adjacent door opening of the car.

9. The foldable car seat extensions set forth in claim 1 wherein said upright comprises a rectangularly shaped upright.

10. The foldable car seat extension set forth in claim 1 wherein said upright comprises a rectangularly shaped upright, said upright being provided with an abutment adapted to engage said other end of said support member.

11. The foldable car seat extension set forth in claim 1 wherein said upright is provided with a plurality of vertically aligned abutments adapted to engage said other end of said support member.

PAUL R. PRENTICE.

REFERENCES CITED

The following references are of record in the file of this patent:

UNITED STATES PATENTS

| Number | Name | Date |
| --- | --- | --- |
| 116,119 | Wahlstedt | June 20, 1871 |
| 236,428 | Hall | Jan. 11, 1881 |
| 566,836 | Avery | Sept. 1, 1896 |
| 773,086 | Minor | Oct. 25, 1904 |
| 1,451,655 | Gilley | Apr. 10, 1923 |

FOREIGN PATENTS

| Number | Country | Date |
| --- | --- | --- |
| 236,402 | Great Britain | July 9, 1925 |